Figure 1:
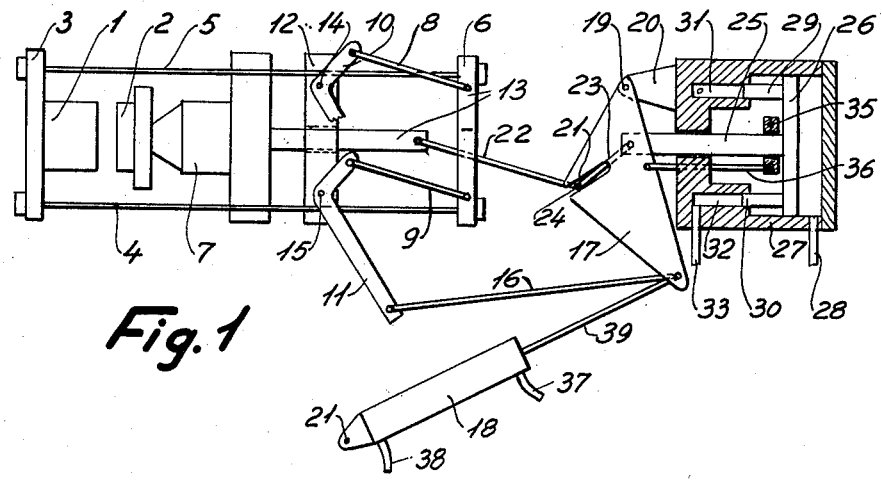

April 27, 1965   C. C. GRAVESEN   3,179,981
INJECTION MOULDING MACHINES
Filed April 23, 1962

INVENTOR
Carl C. Gravesen
BY
Watson, Cole, Grindle & Watson
ATTORNEYS 3,179,981
INJECTION MOULDING MACHINES
Carl Christian Gravesen, Randersgade 29,
Copenhagen, Denmark
Filed Apr. 23, 1962, Ser. No. 189,594
Claims priority, application Denmark, Apr. 24, 1961,
1,659/61
4 Claims. (Cl. 18—30)

This invention relates to an injection molding machine for molding of plastic material, in particular thermoplastic materials.

The machine in its preferred embodiments comprises two clamping plates each supporting a part of a mold and movable to and from each other in cooperation with an injection head for injecting the plasticized material by means of an injection plunger. The injection plunger is during the first part of its movement, viz. the feeding stroke, moved by means of a toggle mechanism, and the injection stroke of the injection plunger is produced by means of a pressure gas or other fluid.

For moving the injection plunger it is known to use a hydraulic fluid compressed by means of a pump. In order to move the plunger during the injection stroke, the connection between a reservoir containing the hydraulic fluid is opened, and after the stroke is finished the cylinder moving the plunger is vented in order to return the plunger. Usually the return movement of the plunger is caused by opening a connection to the reservoir.

In machines of this kind it is necessary to re-build the pressure in the hydraulic reservoir by means of a pump after each injection stroke. According to the present invention, the pressure of the accumulating container is used for moving the injection plunger during the injection stroke thereof, and the pressure in the accumulating container is re-built after each injection operation by using a prime mover which forces the piston—used for moving the plunger—to the initial position thereof, so that the pressure of the accumulating container is re-built without using a feeding pump therefor and without using any valve means for establishing the communication between the accumulating container and the cylinder of the piston or for interrupting such communication during the return stroke of the plunger.

Other objects and features of novelty will be apparent from the following specification when read in connection with the accompanying drawings in which one embodiment of the invention is illustrated by way of example.

Figure 2:
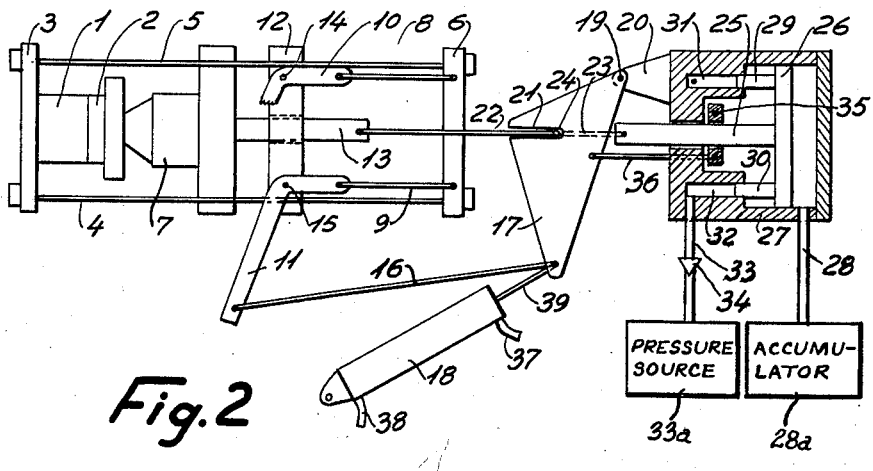

In the drawings:

FIG. 1 diagrammatically shows an injection moulding machine embodying the principles of the invention, with the mould of the machine in open position, and FIG. 2 is a similar view showing the mould in closed position.

In the drawing, 1 and 2 represent two mold parts for the machine illustrated. The mould part 1 is carried by a traverse 3 which, by means of two rods 4 and 5, illustrated in the drawing in the form of dotted lines, is rigidly connected with an operating traverse 6.

7 is the injection head of the machine illustrated which head is fixedly mounted in and forming a part of the frame of the machine, and to this the second mould part 2 is attached, or alternatively the latter may be slidably mounted in the frame of the machine, in a manner known per se, so that it may be pressed against the injection head 7 by the mould part 1 against the influence of a spring after the mould part 1 has been engaged with the second mould part 2. The closing movement of the mould part 1 is transferred thereto from the traverse 6, two rigid rods 8 and 9 being hingedly connected to the latter, which rods, for the sake of clarity, are only represented by lines in the drawing. The other end of each of the rods 8 and 9 is rotatably connected with a bell crank lever 10 and 11 respectively, the latter being rotatably mounted on a stationary frame member 12 which at the same time serves to guide the injection plunger 13 of the machine.

In the drawing, the axes of rotation 14 and 15 of the bell crank levers 10 and 11 respectively are illustrated as being disposed at right angles to the plane of the paper and symmetrically on either side of the longitudinal axis of the injection plunger 13. However, this orientation is only selected to facilitate the understanding of the drawing, the axes 14 and 15 being in reality disposed in a common line intersecting the central axis of the injection plunger 13. The arms of the bell crank levers 10 and 11 shown in the drawing as extending downwards, and of which the arm of the ball crank lever 10 is only represented in part, are coupled together and connected through a rigid rod 16 with a toggle operating member 17 adapted to be rotated about a pivot 19 carried by a fixed bracket 20 by means of a hydraulic or pneumatic jack 18. The jack 18 is rotatably mounted on a pivot 21 so as to permit of the rotating movement of the guide member 17 about the pivot 19.

The toggle operating member 17 has a rectilinear guiding slot 21a, the side walls of which form guide paths for the pivot 24 of a toggle 22, 23. The toggle member 22 is hingedly connected with the end of the injection plunger 13, and the toggle member 23 is hingedly connected with the piston rod 25 of an actuating piston 26 which is slidably mounted in a cylinder 27. The side of the piston 26 remote from the piston rod 25 is subjected to the pressure of a pressure accumulating container 28a, which is connected with the cylinder through a pipe 28. The piston 26 carries two small pistons 29 and 30 extending in the same direction as the piston rod 25 and being respectively slidably mounted in cylindrical bores 31 and 32 which communicate with each other and with a pipe 33, the latter communicating through a non-return valve 34, FIG. 2, with a tank 33a. A traverse 35 is slidably mounted on the piston rod 25 and is connected through two rigid rods with the toggle operating member 17. Of these rods, only one, 36, is illustrated in the drawing, and for the sake of clarity, this is illustrated as being disposed in the plane of the paper. In reality, the two rods are located on opposite sides of the central axis of the piston rod 25 in the same plane as the latter, and this plane is perpendicular to the commn central plane of the pistons 29 and 30 and the piston rod 25. Suitable holes are provided in the end of the cylinder 27 facing the toggle operating member 17 so as to permit of oscillating movement of the rods 36 when the toggle operating member 17 is rotated.

The injection moulding machine illustrated operates as follows:

In order to close the mould parts 1 and 2 together, and press them against the injection head 7, pressure medium is supplied to one pipe 37 of the jack 18, whereby the jack exerts a pull in its piston rod 39. Thereby the toggle operating member 17 is rotated about its pivot 19 and the bell crank levers 10 and 11 are rotated until the rods 8 and 9, acting as toggles, are directed parallel to the axis of the injection plunger 13, such as illustrated in FIG. 2.

By this movement, the traverse 6 is moved to the right and carries the mould part 1 along by way of the rods 4 and 5.

By the rotation of the toggle operating member 17, the toggle 22–23 is moved to its rectilinear position, as illustrated in FIG. 2, the pivot 24 being at the same time displaced inwards in the slot 21. During this straightening of the toggle 22–23, the injection plunger 13 is moved inwards through a distance corresponding to the "feed stroke" thereof, which is intended to mean the movement performed by the end of the injection plunger to pass by an opening in the wall of the injection moulding cylinder through which the material is supplied.

During this movement, the piston 26 is obtained by the non-return valve 34, FIG. 2, this non-return valve preventing the escape of oil or other hydraulic fluid from the cylinders 31–32 so that the piston 26 cannot yield to the accumulating pressure built up in the accumulating container 28a during the preceding working cycle of the injection moulding machine.

When the position illustrated in FIG. 2 has been reached, the non-return valve 34 is opened, and thereby the pressure of the pressure accumulating container moves the piston 26 to the left in the drawing, whereby this movement will be transferred to the injection plunger 13 by way of the straightened toggle 22–23, the injection plunger thereby performing the remainder of its stroke, viz. the real injection stroke. While this take place, the pivot 24 is guided by the slot of the toggle operating member 17 so that the straightened position of the toggle is secured during this movement.

Upon termination of the injection stroke, pressure medium is supplied to the jack 18 through its pipe 38 while at the same time the pipe 37 is opened whereby the piston rod 39 of the jack will be moved to the right so as to rotate the toggle operating member 17 to the position illustrated in FIG. 1. At the same time, the mould is opened and by way of the rods 36 the traverse 35 will move the piston 26 back to the position illustrated in FIG. 1 thereby compressing the medium in the pressure accumulating container. During this movement, the pistons 29 and 30 are moved outwards in their respective cylinders, whereby oil is sucked into the latter through the non-return valve 34. After the moulded work piece has been expelled, the machine is now ready for a new injection moulding cycle.

In FIG. 1 the traverse 35 is illustrated, for the sake of clarity, as having a small clearance from the piston 26, but it will be understood that in the position illustrated in FIG. 1, the traverse 35 abuts the piston 26, seeing that it is the traverse that moved the piston to the position illustrated. Since the traverse 35 functions to move the piston 26 in only one direction of its movement, namely the retraction or pressure accumulating direction, it may be thought of as a one-way clutch connected between the piston and the rotable toggle operating member 17.

What I claim is:

1. An injection molding machine comprising two mold parts one of which carries an injection head, an injection plunger operable in said head upon closure of two mold parts one upon the other, a power cylinder, a piston movable in said cylinder, a piston rod carried by said piston, toggle means operatively interposed between said rod and said plunger, means for extending said toggle to initiate the effective movement of said plunger, means placing the portion of the cylinder behind said piston in communication with a pressure accumulating container, means for venting the forward portion of said cylinder after said toggle has been made to complete the injection movement of said plunger, and means for breaking said toggle and for moving said piston rearwardly in said cylinder and replenishing said pressure accumulating container for providing power for the piston for the next injection cycle.

2. An injection molding machine comprising two mold parts one of which carries an injection head, an injection plunger operable in said head upon closure of two mold parts one upon the other, a power cylinder, a piston movable in said cylinder, a piston rod carried by said piston, toggle means operatively interposed between said rod and said plunger, means for extending said toggle to initiate the effective movement of said plunger, means placing the portion of the cylinder behind said piston in communication with a pressure accumulating container, means for venting the forward portion of said cylinder after said toggle has been made to complete the injection movement of said plunger, and power means for breaking said toggle, operative connections between said last-named means and said piston for moving said piston rearwardly in said cylinder to replenish said pressure accumulating container for providing power for the piston for the next injection cycle, and means operable by said power means for also closing said mold parts upon each other.

3. An injection molding machine comprising a stationary frame which frame includes an injection mold head and a supporting and guiding member, a first clamping plate supporting a first mold part, a second clamping plate supporting a second complementary mold part, said injection head operatively connected with said second plate, means supporting said first clamping plate and slidable with relation to said stationary guiding member to move said first-named mold part toward and from said second-named mold part and stationary injection head, at least one lever fulcrumed on one of said stationary frame parts and having one of its ends connected to said slidable supporting means, an injection plunger movable in said injection head, a fluid pressure cylinder fixedly carried by said machine and a piston slidably received in said cylinder and carrying a piston rod extending through one end of said cylinder, toggle means operatively connecting said injection plunger and said piston rod, a pressure accumulating container in communication with said cylinder at the opposite end thereof and means for the controlled venting of said cylinder at said first-named end thereof, a toggle operating member fulcrumed to a fixed point on the machine, means operatively connecting said last-named member to said toggle whereby upon pivotal movement of said toggle operating member in one direction the toggle is extended into alignment with said injection plunger and said piston rod and serves to operate said plunger and rod, and upon movement in the opposite direction the toggle is broken to cause said plunger and said rod to approach each other, said venting means being operative to permit said piston and rod to actuate said injection plunger during at least part of the injection stroke, means connected with said toggle operating member for moving said piston in the direction away from said injection plunger and toward the said opposite end of the cylinder in order to replenish said pressure accumulating container, and means operatively connected with both said toggle operating member and said sliding member to actuate the same.

4. An injection molding machine comprising a stationary frame which frame includes an injection mold head and a supporting and guiding member, a first clamping plate supporting a first mold part, a second clamping plate supporting a second complementary mold part, said injection head operatively connected with said second plate, means supporting said first clamping plate and slidable with relation to said stationary guiding member to move said first-named mold part toward and from said second-named mold part and stationary injection head, at least one lever fulcrumed on one of said stationary frame parts and having one of its ends connected to said slidable supporting means, an injection plunger movable in said injection head and also guided in said supporting and guiding member, a fluid pressure cylinder fixedly carried by said machine and a piston slidably received in said cylinder and carrying a piston rod extending through one end of said cylinder, toggle means operatively connecting said injection plunger and said piston rod, a pressure accumulating container in communication with said cylinder at the opposite end thereof and means for the controlled venting of said cylinder at said first-named end thereof, a toggle operating member fulcrumed to a fixed point on the machine, a slot in said toggle operating member in which is received and guided the toggle pivot whereby upon pivotal movement of said toggle operating member in one direction the toggle is extended into alignment with said injection plunger and said piston rod and serving to operate said plunger and rod, and upon movement in the opposite direction the toggle is broken to cause said plunger and said rod to approach each other, said venting means being operative to permit said piston and rod to actuate said injection plunger during at least part of the injection stroke, one-way operating means connected with said toggle operating member for contacting and moving said piston in the direction away from said injection plunger and toward the said opposite end of the cylinder rod to replenish said pressure accumulating container, this being the sole means for supplying pressure fluid to said cylinder for actuating said piston and rod, and a common prime mover operatively connected with both said toggle operating member and said sliding member to actuate the same.

References Cited by the Examiner

UNITED STATES PATENTS

| | | | |
|---|---|---|---|
| 2,356,634 | 8/44 | Von Opel | 18—30 |
| 2,433,654 | 12/47 | Dinzl | 18—30 |
| 2,460,468 | 2/49 | Reiner | 18—30 |
| 2,479,433 | 8/49 | Tucker | 18—30 |
| 2,585,112 | 2/52 | Gravesen | 18—30 |
| 3,049,757 | 8/62 | Hagerborg | 18—30 |

MICHAEL V. BRINDISI, *Primary Examiner*.